B. DOUTHETT.
Bee Hive.

No. 84,052. Patented Nov. 17, 1868.

WITNESSES:
Josiah W. Ells,
James B. Whaley

INVENTOR:
Benj. Douthett

BENJAMIN DOUTHETT, OF PITTSBURG, PENNSYLVANIA.

Letters Patent No. 84,052, dated November 17, 1868.

IMPROVEMENT IN BEE-HIVES.

The Schedule referred to in these Letters Patent and making part of the same.

*To all whom it may concern:*

Be it known that I, BENJAMIN DOUTHETT, of Pittsburg, in the county of Allegheny, and State of Pennsylvania, have invented a new and useful Improvement in Bee-Hives; and I hereby declare that the following is a full, clear, and exact description of its construction, reference being had to the accompanying drawings, forming part of this specification, and to the letters of reference marked thereon.

In the drawings—

All the drawings are lettered, and similar letters denote corresponding parts in both views.

Figure 1:
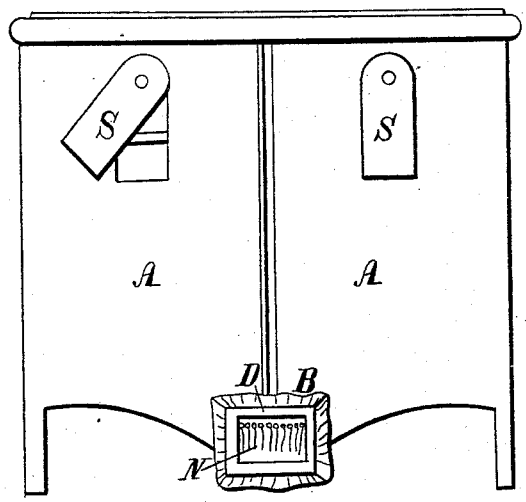
Figure 1 represents a front elevation of my hive.
Figure 2:
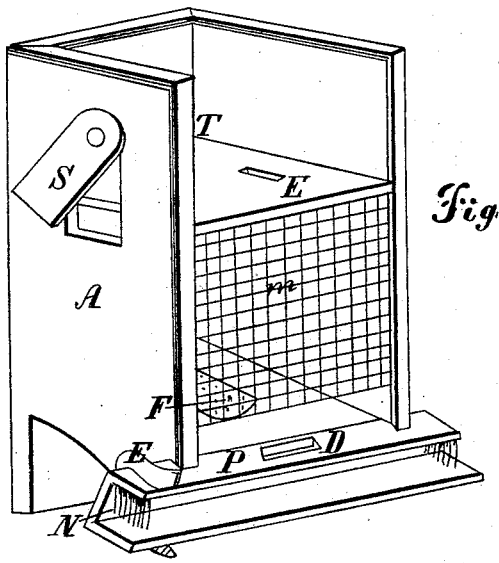
Figure 2 represents a perspective view of one-half of the hive, with the top removed, to show the interior.

I construct my bee-hive in the shape of a rectangular box, divided on a vertical line in the middle, so as to form two equal parts, A A, and so arranged with relation to each other as to be easily separated or joined together. Between the edges of this box, and at that point where the two halves meet, I insert a strip of India rubber, T, that, when the halves A A are brought together, the joint between the two will be perfectly air-tight, keeping out such moisture as might otherwise interfere with the working of the bees.

The bottom of each half of the hive inclines downward toward that point where the two halves meet, forming a sloping plane for the ready escape of foreign or excrementitious matter.

Through each of these inclined planes is cut a large hole, covered with a thin metallic plate, F, perforated in such a manner as to form a number of minute apertures for ventilating the hive, and furnishing the bees with the requisite amount of air.

Midway between the slanting bottom of the hive and its top is placed a longitudinal partition, E, having a passage through it for the bees. Upon this partition it is intended to rest the comb-frames, which may be constructed in any of the well-known ways.

In the front of each half, A A, of the hive is a window sufficiently long to light above and below the partition E, for the examination of the interior. In each window is fitted a pane of glass, covered with a shutter, S, pivoted at its top to the hive, so as to be turned to either side, as occasion may require.

The lower portion of each half of the hive, from the partition E down to the slanting bottom, is covered in front with a metallic-wire gauze, m, the meshes of which are sufficiently close to prevent the passage of the bees, the object being to prevent the bees from swarming in the lower part of each half of the hive at the same time, and when the bees begin to swarm, this facilitates their separation, which may be accomplished by slightly opening the joint between the two halves, A A, of the hive, and inserting a piece of thin sheet-iron, sufficient to cut off the connection in the upper part of the hive above the gauze, when the halves may be taken apart, each containing a swarm, and virtually forming two hives. Below this hive, and on a line with its point of separation, is attached a narrow horizontal box, P, the ends of which are open, and project some distance from the hive at the back and front, and are surrounded just at the ends with a collar, B, of some elastic material, which tends to prevent bugs, worms, or grubs, as they crawl over the outside of the box, from entering the open ends. Each open end of this box P is provided with a metallic curtain, N, constructed by suspending, from a horizontal cross-bar, a number of very fine wire rods, barely touching each other, and not quite reaching the bottom of the box P, and as these rods turn freely in either direction, the bees will readily push them aside as they pass and repass on their travel in and out of the hive, and that without any apparent annoyance, while the bee-moth, and other insects, will be restrained from entering.

This box P communicates with the interior of the hive by means of small openings, D, near the centre of its top, and in this case there is one opening leading to each half of the hive.

Having briefly described the construction of my bee-hive,

I claim a hive for bees, having all of the herein-described characteristics, that is to say, a box divided on a vertical line, so as to form two equal and distinct parts, A A, and with an India-rubber packing, T, between the two, each part or half of the hive being provided with a horizontal partition, E, inclined bottom, and perforated plate, F, and a wire gauze, m, extending from the partition to the bottom, and a narrow horizontal box, P, beneath the hive, open at both ends, and provided at each end with a metallic curtain, N, as a passage-way, common to each half of the hive; the whole being constructed, arranged, combined, and operating substantially as and for the purposes hereinbefore set forth.

BENJ. DOUTHETT.

Witnesses:
JOSIAH W. ELLS,
JAMES B. WHALEY.